United States Patent
Kato et al.

(10) Patent No.: US 6,679,598 B2
(45) Date of Patent: Jan. 20, 2004

(54) WATER BASE PIGMENT INK FOR INK-JET RECORDING AND INK-JET RECORDING APPARATUS

(75) Inventors: Ryuji Kato, Aichi-ken (JP); Hideto Yamazaki, Nagoya (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/245,225

(22) Filed: Sep. 16, 2002

(65) Prior Publication Data

US 2003/0112305 A1 Jun. 19, 2003

(30) Foreign Application Priority Data

Sep. 26, 2001 (JP) ........................................ 2001-293382

(51) Int. Cl.$^7$ .................................................. B41J 2/01
(52) U.S. Cl. ...................... 347/100; 347/95; 106/31.13; 106/31.6
(58) Field of Search ............................ 347/100, 96, 95, 347/101; 106/31.13, 31.6, 31.27

(56) References Cited

U.S. PATENT DOCUMENTS

| | | | | | |
|---|---|---|---|---|---|
| 4,505,749 | A | * | 3/1985 | Kanekiyo et al. | ............ 347/100 |
| 5,017,227 | A | * | 5/1991 | Koike et al. | ................ 347/100 |

FOREIGN PATENT DOCUMENTS

JP         08-218014    *  8/1996   .............. B41J/2/01

* cited by examiner

Primary Examiner—Stephen D. Meier
Assistant Examiner—Manish Shah
(74) Attorney, Agent, or Firm—Reed Smith LLP

(57) ABSTRACT

An ink for ink-jet recording of the present invention includes a dispersion of a pigment, and an ink solvent containing a water-soluble organic solvent and glycol ether. The ink is prepared such that an Rf value, which represents a rate of flow of the pigment obtained when the pigment dispersion is developed with the ink solvent by means of paper chromatography, is not more than 0.5. The ink has a fast permeation speed, and hence the feathering and the bleeding are avoided.

12 Claims, 3 Drawing Sheets

WATER BASE PIGMENT INK FOR INK-JET RECORDING AND INK-JET RECORDING APPARATUS

BACKGROUND OF THE INVENTION

1. Field of the Invention

The present invention relates to a water base pigment ink for ink-jet recording and an ink-jet recording apparatus which accommodates the same.

2. Description of the Related Art

In the ink-jet recording system, ink droplets are formed by a variety of ink discharge method including, for example, the electrostatic attraction method, a method in which mechanical vibration or displacement is applied to the ink with a piezoelectric element, and a method in which bubbles are generated by heating the ink to utilize the pressure generated thereby, and all or a part of the ink droplets are adhered to a recording objective such as paper to perform the recording.

The ink for ink-jet recording, which is used for the ink-jet recording system as described above, includes those in which various water-soluble dyes or pigments are dissolved or dispersed in a liquid medium composed of water and a water-soluble organic solvent. The water-soluble dye and the pigment may be compared with each other as follows. That is, the water-soluble dye is inferior in water resistance of recorded matters because of such a property that the water-soluble dye is dissolved in water, and the water-soluble dye is also greatly inferior in light resistance as compared with the pigment due to its chemical structure. On the other hand, the pigment is satisfactory in water resistance of recorded matters as compared with the water-soluble dye, because the pigment is water-insoluble. Therefore, in recent years, the changeover is progressively effected for the ink for ink-jet printer from the water-soluble dye ink to the pigment ink.

Nowadays, the recording quality, which is equivalent to those of photographic images, is required for the ink-jet printer. In order to satisfy such a demand, it is necessary for the recorded matter that the blurring on the paper surface including, for example, the feathering and the bleeding is restricted as less as possible, and the contour of the image is sharp. In general, a permeating agent is added to the ink for ink-jet recording in order to avoid the blurring. The permeating agent functions to quickly permeate the ink for ink-jet recording into the paper. As a result, it is possible to reduce the feathering and the bleeding. In this specification, the feathering refers to the fine blurring of the ink caused when the recording is performed with the ink of one color, and the bleeding refers to the blurring caused at the boundary between different colors when the color recording is performed with the inks of two or more colors.

Glycol-based n-butyl ether is known as permeating agents which are preferably selected for the water base ink for ink-jet recording from the permeating agents as described above. The glycol-based n-butyl ether includes, for example, ethylene glycol n-butyl ether, diethylene glycol n-butyl ether, triethylene glycol n-butyl ether, propylene glycol n-butyl ether, dipropylene glycol n-butyl ether, and tripropylene glycol n-butyl ether. However, when the glycol-based n-butyl ether is used for the water base pigment ink for ink-jet recording in which the pigment is used as the coloring agent, a problem has arisen such that the feathering and the bleeding cannot be sufficiently reduced.

SUMMARY OF THE INVENTION

The present invention has been made in order to solve the problem as described above, an object of which is to provide a water base pigment ink for ink-jet recording with which the feathering and the bleeding can be reduced, and an ink-jet recording apparatus which accommodates the same.

According to a first aspect of the present invention, there is provided a method for producing an ink for ink-jet recording, comprising preparing a dispersion of a pigment; preparing an ink solvent containing a water-soluble organic solvent and glycol ether; and mixing the pigment dispersion and the ink solvent; wherein amounts of respective components for constituting the pigment dispersion and the ink solvent are adjusted so that an Rf value, which represents a rate of flow of the pigment obtained when the pigment dispersion is developed with the ink solvent by paper chromatography, is not more than 0.5. According to the method for producing the ink of the present invention, the amounts of addition of the pigment dispersion and the ink solvent are established so that the Rf value, which represents the rate of flow of the pigment obtained when the pigment dispersion is developed with the ink solvent by paper chromatography, is not more than 0.5. On condition that the Rf value of the rate of flow is not more than 0.5, the pigment particles tend to stay at the place on the paper surface onto which the ink has been jetted, because the permeation speed of the ink into the paper is fast. As a result, it is possible to provide the ink with which the blurring such as the feathering and the bleeding can be suppressed.

According to a second aspect of the present invention, there is provided an ink for ink-jet recording comprising a dispersion of a pigment; a water-soluble organic solvent; and at least one glycol ether selected from the group consisting of ethylene glycol propyl ether, diethylene glycol propyl ether, triethylene glycol propyl ether, propylene glycol propyl ether, dipropylene glycol propyl ether, and tripropylene glycol propyl ether; wherein an Rf value, which represents a rate of flow of the pigment obtained when the pigment dispersion is developed by paper chromatography with a mixture liquid containing constitutive components of the ink except for the pigment dispersion, is not more than 0.5.

According to a third aspect of the present invention, there is provided an ink-jet recording apparatus comprising an ink-jet head; an ink tank which accommodates an ink to be supplied to the ink-jet head; and the ink of the present invention which is accommodated in the ink tank. When an image is formed by using the recording apparatus which accommodates the ink of the present invention, especially an ink set (ink cartridge), it is possible to suppress the blurring such as the feathering and the bleeding. The ink tank may be an ink container fixedly provided in the apparatus or an ink cartridge which is replaceable.

BRIEF DESCRIPTION OF THE DRAWINGS

An embodiment of the invention will be described in detail with reference to the following figures wherein.

DESCRIPTION OF THE PREFERRED EMBODIMENTS

Figure 1:
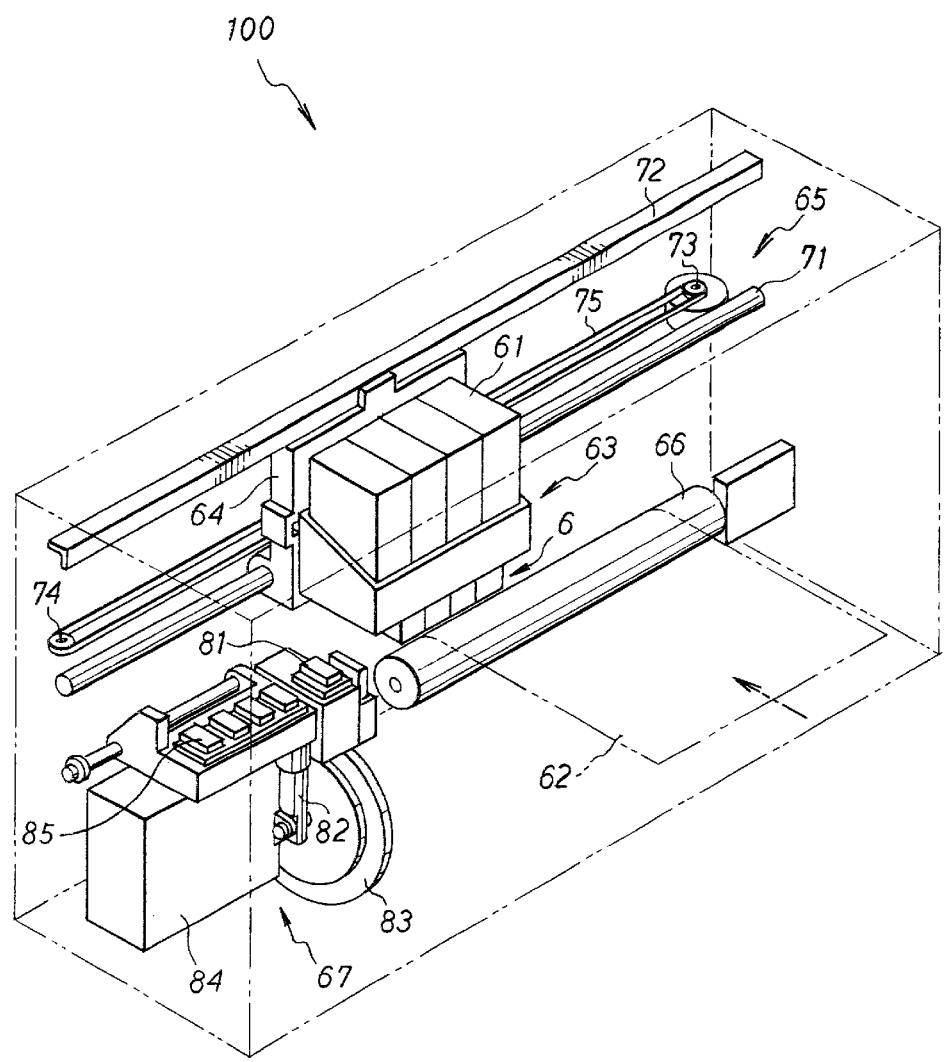
FIG. 1 is a perspective view showing a color ink-jet printer having an ink cartridge which contains ink prepared in examples of the invention.

The water base pigment ink for ink-jet recording of the present invention contains the dispersion of the self-dispersing pigment and the water-soluble organic solvent.

In this specification, the term "pigment" includes not only ordinary pigments but also self-dispersing pigments and color material particles. The self-dispersing pigment is the pigment which is dispersible in water without any dispersing agent as a result of application of a surface treatment for coupling at least one functional group of carbonyl group, carboxyl group, hydroxyl group, and sulfone group or salt thereof. The method for the surface treatment includes, for example, a method in which oxidation is performed with hypohalite after applying, to the pigment, a surface-reforming treatment such as a plasma treatment or an oxidation treatment with an ordinary oxidizing agent, and a method in which diazonium salt is subjected to a reduction reaction in an aqueous solution of pH=2 containing the pigment and the diazonium salt.

The pigment, which is appropriate to apply the surface treatment, is not specifically limited. However, the carbon black includes, for example, MA8 and MA 100 (both produced by Mitsubishi Chemical Corporation) and Color Black FW200 (produced by Degussa). The yellow pigment, which is appropriate to apply the surface treatment, includes, for example, C. I. Pigment Yellow 3, 13, 74, 83, and 154. Especially, Pigment Yellow 74 includes, for example, HANSA BRILL. YELLOW 5GXW (produced by Clariant). The red pigment, which is appropriate to apply the surface treatment, includes, for example, C. I. Pigment Red 5, 48, 112, 122, 177, 202, and 207. Especially, Pigment Red 122 includes, for example, Fastogen Super Magenta R (produced by Dainippon Ink and Chemicals, Incorporated). The blue pigment, which is appropriate to apply the surface treatment, includes, for example, C. I. Pigment Blue 15, 15:3, 15:4, 16, and 60. Especially, Pigment Blue 15:3 includes, for example, HELIOGEN BULED 7080 (produced by BASF).

Commercially available produces, which have been subjected to the surface treatment, can be also used as the self-dispersing pigment. Those commercially available may include, for example, CAB-O-JET 200 and CAB-O-JET 300 (produced by Cabot) and Bonjet CW1 (produced by Orient Chemical Industries, Ltd.). The blending amount of the self-dispersing pigment is changed depending on the coloration and the recording density to be desired. However, in general, the blending amount is preferably 1 to 15% by weight and more preferably 1 to 10% by weight with respect to the total amount of the water base pigment ink for ink-jet recording.

Those which can be added to the dispersion of the self-dispersing pigment include the self-dispersing pigment and water as described above, as well as those which are the same as the water-soluble organic solvent to be used for the ink solvent as described later on, including, for example, methyl alcohol, ethyl alcohol, and 1,3-dimethyl-2-imidazolidinone.

The water base pigment ink of the present invention is completed by adding the ink solvent composed of, for example, the water-soluble organic solvent, the glycol ether, and water to the dispersion of the self-dispersing pigment, and mixing the components homogeneously.

The water-soluble organic solvent has, for example, the following effects. That is, the ink is prevented from drying at the tip of the ink-jet head, the recording density is increased, and the color is developed vividly. The water-soluble organic solvent is not specifically limited, which includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or ketone alcohols such as acetone and diacetone alcohol; ethers such as tetrahydrofuran and dioxane; glycerol, 2-pyrrolidone, N-methyl-2-pyrrolidone, and 1,3-dimethyl-2-imidazolidinone. The blending amount of the water-soluble organic solvent is preferably 5 to 50% by weight, more preferably 10 to 40% by weight, and much more preferably 15 to 35% by weight with respect to the total amount of the water base pigment ink for ink-jet recording.

The water base pigment ink for ink-jet recording of the present invention contains at least one glycol ether selected from the group consisting of ethylene glycol propyl ether, diethylene glycol propyl ether, triethylene glycol propyl ether, propylene glycol propyl ether, dipropylene glycol propyl ether, and tripropylene glycol propyl ether. The blending amount of the glycol ether is preferably 1 to 10% by weight with respect to the total amount of the water base pigment ink for ink-jet recording. If the blending amount is less than 1% by weight, the feathering and the bleeding cannot be reduced in some cases. If the blending amount exceeds 10% by weight, the feathering and the bleeding are inversely caused in some cases. More preferably, the blending amount is 1 to 5% by weight.

As for the water base pigment ink for ink-jet recording of the present invention, the Rf value, which represents the rate of flow of the self-dispersing pigment obtained when the dispersion of the self-dispersing pigment is developed by means of paper chromatography with a mixture liquid (hereinafter referred to as "ink solvent" as well) of the constitutive components of the ink obtained by excluding the dispersion of the self-dispersing pigment from the water base pigment ink for ink-jet recording of the present invention, indicates not more than 0.5.

The Rf value of the rate of flow is the ratio of the distance of movement of the sample component to the distance up to the front end of the permeation of the solvent, obtained when the development is effected by means of the paper chromatography. The paper, with which the paper chromatography is carried out, is the paper which is usable for the ink-jet recording and which is most dominantly used in the United States. At present, the business paper, which is most dominantly used in the United States, is BUSINESS MULTI-PURPOSE 4200 produced by XEROX. Therefore, this paper is used as the standard paper for measuring the Rf value by means of the paper chromatography. The Rf value of the rate of flow of the self-dispersing pigment, which is obtained by developing the dispersion of the self-dispersing pigment by means of the paper chromatography by using the ink solvent excluding the dispersion of the self-dispersing pigment, can be determined in accordance with the following expression (1).

$$Rf \text{ value of rate of flow} = \quad (1)$$
$$(\text{distance of movement of self-dispersing pigment particles})/(\text{distance to front end of permeation of ink solvent excluding dispersion of self-dispersing pigment})$$

The low Rf value of the rate of flow means the fact that the speed of the ink solvent to permeate into the paper is much faster than the speed of the pigment particles to permeate into the paper, wherein the ink solvent quickly permeates into the paper surface, and the pigment particles stay on the paper surface, when the ink droplets are deposited onto the paper surface. Therefore, when the Rf value of the rate of flow is low, it is possible to reduce the blurring such as the feathering and the bleeding. On the contrary, the high Rf value of the rate of flow means the fact that the speed of the pigment particles to permeate into the paper is close to the speed of the ink solvent to permeate into the paper, wherein the pigment particles permeate into the paper surface together with the ink solvent, when the ink droplets are deposited onto the paper surface. Therefore, the blurring such as the feathering and the bleeding conspicuously appears together with the blurring of the ink solvent.

As a result of diligent investigations performed by the present inventors, it has been found out that the Rf value of the rate of flow can be lowered, and the blurring such as the feathering and the bleeding can be sufficiently reduced by containing at least one glycol ether selected from the group consisting of ethylene glycol propyl ether, diethylene glycol propyl ether, triethylene glycol propyl ether, propylene glycol propyl ether, dipropylene glycol propyl ether, and tripropylene glycol propyl ether in the water base pigment ink for ink-jet recording. Thus, the present invention has been completed.

The water base pigment ink for ink-jet recording of the present invention contains water as the ink solvent. As for the water, it is preferable to use deionized water other than ordinary water containing various ions. The blending amount of water is determined within a wide range depending on the type and the composition of the water-soluble organic solvent and the desired characteristics of the water base pigment ink for ink-jet recording. However, in general, the blending amount is preferably 10 to 95% by weight, more preferably 10 to 70% by weight, and much more preferably 20 to 70% by weight with respect to the total amount of the water base pigment ink for ink-jet recording.

It is preferable that the water base pigment ink for ink-jet recording of the present invention contains water-soluble glycol as the moistening agent in order to avoid any clog-up at the nozzle of the ink-jet head. The water-soluble glycol includes, for example, glycerol, ethylene glycol, diethylene glycol, triethylene glycol, polyethylene glycol, propylene glycol, dipropylene glycol, tripropylene glycol, polypropylene glycol, 1,5-pentanediol, and 1,6-hexanediol. In general, the blending amount of the water-soluble glycol is preferably 5 to 50% by weight, more preferably 10 to 40% by weight, and much more preferably 15 to 35% by weight with respect to the total amount of the water base pigment ink for ink-jet recording.

Additionally, for example, a surfactant, a viscosity-adjusting agent, a surface tension-adjusting agent, and a fungicide may be added to the water base pigment ink for ink-jet recording of the present invention, if necessary. The viscosity-adjusting agent includes, for example, polyvinyl alcohol, cellulose, and water-soluble resin.

As described above, in the water base ink for ink-jet recording of the present invention, the problem involved in the conventional technique is sufficiently solved. It is possible to reduce the feathering and the bleeding, and it is possible to provide the vivid recording. The ink-jet recording apparatus, which accommodates the water base pigment ink for ink-jet recording of the present invention, is also included in one of the aspects of the present invention.

The present invention will be explained in further detail below as exemplified by Examples. However, the present invention is not limited to only Examples.

EXAMPLE 1

Preparation of pigment dispersion: Thirty (30) g of Carbon Black MA100 (produced by Mitsubishi Chemical Corporation) was sufficiently mixed with 100 ml of water, to which 45 g of sodium hypochlorite (effective chlorine concentration: 12% by weight) was thereafter added dropwise, followed by being agitated at 100° C. for 10 hours. The obtained slurry was dried, and then it was purified by repeating washing with water to obtain the surface-treated carbon black dispersible in water. The obtained carbon black was dispersed in 200 ml of water to prepare a carbon black dispersion having a pigment concentration of 15% by weight and an average particle size of 0.15 μm.

Preparation of water base pigment ink for ink-jet recording: Thirty-seven (37) parts by weight of water, 25 parts by weight of glycerol, and 5 parts by weight of ethylene glycol propyl ether were mixed to prepare 67 parts by weight of ink solvent. The entire amount of the ink solvent was gradually added while agitating 33 parts by weight of the carbon black dispersion. Agitation was performed for further 30 minutes, followed by performing filtration with a membrane filter having a pore size of 1 μm to prepare a water base pigment ink for ink-jet recording.

Measurement of Rf value of rate of flow: About 2 μl of the carbon black dispersion was dripped in a spot form by using a capillary tube onto BUSINESS MULTIPURPOSE 4200 PAPER (hereinafter referred to as "XEROX 4200 paper", produced by XEROX) cut to have a size of 3 cm×1.5 cm. The dripped carbon black dispersion was dried. After that, a portion of the XEROX 4200 paper, which ranged from one end of the piece of paper to a position just before the drip point, was immersed in the ink solvent in a tightly closed vessel to effect development by means of paper chromatography for about 30 minutes. The distance A which the pigment particles moved in the development by the paper chromatography, and the distance B which the solvent of the water base pigment ink for ink-jet recording developed were measured. As a result, the distance A was 0.9 cm, and the distance B was 2.5 cm. The Rf value of the rate of flow of the self-dispersing pigment was 0.36 with respect to the ink solvent obtained by excluding the dispersion of the self-dispersing pigment from the water base pigment ink for ink-jet recording of Example 1.

EXAMPLE 2

Thirty (30) g of Monoazo Yellow pigment (Pigment Yellow 74) and 6.0 g of sulfanilic acid were mixed. One hundred (100) g of sodium nitrite aqueous solution (0.3% by weight) was added dropwise to an obtained mixture while performing agitation, followed by performing agitation at 70° C. for 1 hour. An obtained slurry was dried, and then it was purified by repeating washing with water to obtain the surface-treated Monoazo Yellow pigment dispersible in water. The obtained Monoazo Yellow pigment was dispersed in 200 ml of water to prepare a Monoazo Yellow pigment dispersion having a pigment concentration of 15% by weight and an average particle size of 0.11 μm. A water base pigment ink for ink-jet recording was prepared in the same manner as in Example 1 in accordance with the composition shown in Table 1 by using the Monoazo Yellow pigment dispersion. Numerals appended adjacently to the material names in Table 1 indicate the blending amounts of the materials (parts by weight). The Rf value of the rate of flow of the self-dispersing pigment was 0.43 with respect to the ink solvent obtained by excluding the dispersion of the self-dispersing pigment from the water base pigment ink for ink-jet recording of Example 2.

EXAMPLE 3

Thirty (30) g of Quinacridone Magenta pigment (Pigment Red 122) and 6.0 g of sulfanilic acid were mixed. One hundred (100) g of sodium nitrite aqueous solution (0.3% by weight) was added dropwise to an obtained mixture while performing agitation, followed by performing agitation at 70° C. for 1 hour. An obtained slurry was dried, and then it was purified by repeating washing with water to obtain the surface-treated Quinacridone Magenta pigment dispersible in water. The obtained Quinacridone Magenta pigment was dispersed in 200 ml of water to prepare a Quinacridone Magenta pigment dispersion having a pigment concentration of 15% by weight and an average particle size of 0.13 μm. A water base pigment ink for ink-jet recording was prepared in the same manner as in Example 1 in accordance with the composition shown in Table 1 by using the Quinacridone Magenta pigment dispersion. The Rf value of the rate of flow of the self-dispersing pigment was 0.39 with respect to the ink solvent obtained by excluding the dispersion of the self-dispersing pigment from the water base pigment ink for ink-jet recording of Example 3.

EXAMPLE 4

Thirty (30) g of Phthalocyanine Blue pigment (Pigment Blue 15:3) and 6.0 g of sulfanilic acid were mixed. One hundred (100) g of sodium nitrite aqueous solution (0.3% by weight) was added dropwise to an obtained mixture while performing agitation, followed by performing agitation at 70° C. for 1 hour. An obtained slurry was dried, and then it was purified by repeating washing with water to obtain the surface-treated Phthalocyanine Blue pigment dispersible in water. The obtained Phthalocyanine Blue pigment was dispersed in 300 ml of water to prepare a Phthalocyanine Blue pigment dispersion having a pigment concentration of 15% by weight and an average particle size of 0.11 μm. A water base pigment ink for ink-jet recording was prepared in the same manner as in Example 1 in accordance with the composition shown in Table 1 by using the Phthalocyanine Blue pigment dispersion. The Rf value of the rate of flow of the self-dispersing pigment was 0.28 with respect to the ink solvent obtained by excluding the dispersion of the self-dispersing pigment from the water base pigment ink for ink-jet recording of Example 4.

EXAMPLE 5

A water base pigment ink for ink-jet recording was prepared in the same manner as in Example 1 in accordance with the composition shown in Table 1 by using CAB-O-JET 300 (produced by Cabot, carbon black concentration: 15% by weight) as a commercially available surface-treated pigment dispersion. The Rf value of the rate of flow of the self-dispersing pigment was 0.24 with respect to the ink solvent obtained by excluding the dispersion of the self-dispersing pigment from the water base pigment ink for ink-jet recording of Example 5.

EXAMPLE 6

A water base pigment ink for ink-jet recording was prepared in the same manner as in Example 1 in accordance with the composition shown in Table 1 by using Bonjet CW1 (produced by Orient Chemical Industries, Ltd., carbon black concentration: 15% by weight) as a commercially available surface-treated pigment dispersion. The Rf value of the rate of flow of the self-dispersing pigment was 0.45 with respect to the ink solvent obtained by excluding the dispersion of the self-dispersing pigment from the water base pigment ink for ink-jet recording of Example 6.

Comparative Example 1

Thirty-seven (37) parts by weight of water, 25 parts by weight of glycerol, and 5 parts by weight of ethylene glycol-n-butyl ether in place of ethylene glycol propyl ether in Example 1 were mixed to prepare 67 parts by weight of a water base pigment ink solvent for ink-jet recording. A water base pigment ink for ink-jet recording was prepared by using the carbon black dispersion obtained in Example 1. The Rf value of the rate of flow of the self-dispersing pigment was 0.60 with respect to the ink solvent obtained by excluding the dispersion of the self-dispersing pigment from the water base pigment ink for ink-jet recording of Comparative Example 1.

Comparative Example 2

A water base pigment ink for ink-jet recording was prepared in the same manner as in Example 1 in accordance with the composition shown in Table 1 by using the Monoazo Yellow pigment dispersion used in Example 2. The Rf value of the rate of flow of the self-dispersing pigment was 0.67 with respect to the ink solvent obtained by excluding the dispersion of the self-dispersing pigment from the water base pigment ink for ink-jet recording of Comparative Example 2.

Comparative Example 3

A water base pigment ink for ink-jet recording was prepared in the same manner as in Example 1 in accordance with the composition shown in Table 1 by using the Quinacridone Magenta pigment dispersion used in Example 3. The Rf value of the rate of flow of the self-dispersing pigment was 0.70 with respect to the ink solvent obtained by excluding the dispersion of the self-dispersing pigment from the water base pigment ink for ink-jet recording of Comparative Example 3.

Comparative Example 4

A water base pigment ink for ink-jet recording was prepared in the same manner as in Example 1 in accordance with the composition shown in Table 1 by using the Phthalocyanine Blue pigment dispersion used in Example 4. The Rf value of the rate of flow of the self-dispersing pigment was 0.60 with respect to the ink solvent obtained by excluding the dispersion of the self-dispersing pigment from the water base pigment ink for ink-jet recording of Comparative Example 4.

Comparative Example 5

A water base pigment ink for ink-jet recording was prepared in the same manner as in Example 1 in accordance with the composition shown in Table 1 by using CAB-O-JET 300 (produced by Cabot, carbon black concentration: 15% by weight) used in Example 5. The Rf value of the rate of flow of the self-dispersing pigment was 0.58 with respect to the ink solvent obtained by excluding the dispersion of the self-dispersing pigment from the water base pigment ink for ink-jet recording of Comparative Example 5.

Comparative Example 6

A water base pigment ink for ink-jet recording was prepared in the same manner as in Example 1 in accordance with the composition shown in Table 1 by using Bonjet CW1 (produced by Orient Chemical Industries, Ltd., carbon black concentration: 15% by weight) used in Example 6. The Rf value of the rate of flow of the self-dispersing pigment was 0.60 with respect to the ink solvent obtained by excluding the dispersion of the self-dispersing pigment from the water base pigment ink for ink-jet recording of Comparative Example 6.

Comparative Example 7

A water base pigment ink for ink-jet recording was prepared in the same manner as in Example 1 in accordance with the composition shown in Table 1 by using Bonjet CW1 (produced by Orient Chemical Industries, Ltd., carbon black concentration: 15% by weight) used in Example 6. The Rf value of the rate of flow of the self-dispersing pigment was 0.62 with respect to the ink solvent obtained by excluding the dispersion of the self-dispersing pigment from the water base pigment ink for ink-jet recording of Comparative Example 7.

TABLE 1

| Name | Color | Pigment dispersion | | Ion exchange water | Glycerol (water-soluble organic solvent) | Glycol ether | |
|---|---|---|---|---|---|---|---|
| Example 1 | BK | Carbon Black | 33 | 37 | 25 | ethylene glycol propyl ether | 5 |
| Example 2 | Y | Monoazo Yellow | 33 | 37 | 25 | diethylene glycol propyl ether | 5 |
| Example 3 | M | Quinacridone Magenta | 33 | 37 | 27 | triethylene glycol propyl ether | 3 |
| Example 4 | C | Phthalocyanine Blue | 33 | 37 | 27 | propylene glycol propyl ether | 3 |
| Example 5 | BK | CAB-O-JET 300 | 33 | 37 | 25 | dipropylene glycol propyl ether | 5 |
| Example 6 | BK | Bonjet CW1 | 33 | 37 | 28 | tripropylene glycol propyl ether | 2 |
| Comp. Ex. 1 | BK | Carbon Black | 33 | 37 | 25 | ethylene glycol-n-butyl ether | 5 |
| Comp. Ex. 2 | Y | Monoazo Yellow | 33 | 37 | 25 | diethylene glycol-n-butyl ether | 5 |
| Comp. Ex. 3 | M | Quinacridone Magenta | 33 | 37 | 25 | triethylene glycol-n-butyl ether | 5 |
| Comp. Ex. 4 | C | Phthalocyanine Blue | 33 | 37 | 25 | propylene glycol-n-butyl ether | 5 |
| Comp. Ex. 5 | BK | CAB-O-JET 300 | 33 | 37 | 25 | dipropylene glycol-n-butyl ether | 5 |
| Comp. Ex. 6 | BK | Bonjet CW1 | 33 | 37 | 28 | tripropylene glycol-n-butyl ether | 2 |
| Comp. Ex. 7 | BK | Bonjet CW1 | 33 | 37 | 29.5 | ethylene glycol propyl ether | 0.5 |

Evaluation of Performance

Printing was performed on XEROX 4200 paper with an ink-jet head of the shearing mode type by using each of the water base inks for ink-jet recording prepared in Examples 1 to 6 and Comparative Examples 1 to 7 to evaluate the feathering on the recorded matter on the basis of the following criterion by means of visual observation. ++: Feathering is not conspicuous. +: Feathering is slightly conspicuous. ±: Feathering is conspicuous, and the printed matter involves practical problem. −: Feathering is clearly conspicuous, and the printed matter is not practically usable. Obtained results are shown in Table 2.

TABLE 2

| Name | Color | Rf value | Feathering |
|---|---|---|---|
| Example 1 | BK | 0.36 | ++ |
| Example 2 | Y | 0.43 | ++ |
| Example 3 | M | 0.39 | ++ |
| Example 4 | C | 0.28 | ++ |
| Example 5 | BK | 0.24 | ++ |
| Example 6 | BK | 0.45 | ++ |
| Comp. Ex. 1 | BK | 0.60 | ± |
| Comp. Ex. 2 | Y | 0.67 | − |
| Comp. Ex. 3 | M | 0.70 | − |
| Comp. Ex. 4 | C | 0.60 | ± |
| Comp. Ex. 5 | BK | 0.58 | + |
| Comp. Ex. 6 | BK | 0.60 | ± |
| Comp. Ex. 7 | BK | 0.62 | ± |

Printing was performed on XEROX 4200 paper with an ink-jet head of the shearing mode type by using the four colors of the water base pigment inks for ink-jet recording of the black inks prepared in Examples 1, 5, and 6, the yellow ink prepared in Example 2, the magenta ink prepared in Example 3, and the cyan ink prepared in Example 4 to evaluate the bleeding caused at the boundary when the water base pigment inks for ink-jet recording having the different colors were combined with each other. On the other hand, the bleeding was evaluated in accordance with the evaluation method described above by using the four colors of the water base pigment inks for ink-jet recording of the black inks prepared in Comparative Examples 1, 5, 6, and 7, the yellow ink prepared in Comparative Example 2, the magenta ink prepared in Comparative Example 3, and the cyan ink prepared in Comparative Example 4 respectively. The bleeding on the recorded matter was evaluated on the basis of the following criterion by means of visual observation. ++: Bleeding is not conspicuous. +: Bleeding is slightly conspicuous. ±: Bleeding is conspicuous, and the printed matter involves practical problem. −: Bleeding is clearly conspicuous, and the printed matter is not practically usable. Obtained results of the evaluation of the bleeding are shown in Tables 3 and 4.

TABLE 3

| | | Black | | | Yellow | Magenta | Cyan |
|---|---|---|---|---|---|---|---|
| | | Example 1 | Example 5 | Example 6 | Example 2 | Example 3 | Example 4 |
| Black | Example 1 | * | * | * | ++ | ++ | ++ |
| | Example 5 | * | * | * | ++ | ++ | ++ |
| | Example 6 | * | * | * | ++ | ++ | ++ |
| Yellow | Example 2 | ++ | ++ | ++ | * | ++ | + |
| Magenta | Example 3 | ++ | ++ | ++ | ++ | * | + |
| Cyan | Example 4 | ++ | ++ | ++ | + | + | * |

TABLE 4

| | | Black | | | | Yellow | Magenta | Cyan |
| --- | --- | --- | --- | --- | --- | --- | --- | --- |
| | | Comp. Ex. 1 | Comp. Ex. 5 | Comp. Ex. 6 | Comp. Ex. 7 | Comp. Ex. 2 | Comp. Ex. 3 | Comp. Ex. 4 |
| Black | Comp. Ex. 1 | * | * | * | * | – | – | ± |
| | Comp. Ex. 5 | * | * | * | * | – | – | ± |
| | Comp. Ex. 6 | * | * | * | * | – | – | ± |
| | Comp. Ex. 7 | * | * | * | * | – | – | – |
| Yellow | Comp. Ex. 2 | – | – | – | – | * | – | – |
| Magenta | Comp. Ex. 3 | – | – | – | – | – | * | – |
| Cyan | Comp. Ex. 4 | ± | ± | ± | – | – | – | * |

As shown in Table 2, when the inks prepared in respective Examples were used, the feathering and the bleeding were scarcely observed. On the other hand, when the inks prepared in respective Comparative Examples were used, then the feathering and the bleeding were conspicuous, and it was impossible to perform satisfactory recording. In Comparative Example 7, ethylene glycol propyl ether was contained. However, the blending amount was small, i.e., 0.5 parts by weight. The Rf value of the rate of flow of the self-dispersing pigment was above 0.5 with respect to the ink solvent obtained by excluding the dispersion of the self-dispersing pigment from the water base pigment ink for ink-jet recording. Therefore, the result was inferior to those obtained in Examples.

An embodiment of an ink jet printer as an ink-jet recording apparatus in accordance with the invention will be described as below with reference to the accompanying drawings.

As shown in FIG. 1, a color ink jet printer 100 includes four ink cartridges (ink set) 61, each of which contains a respective color of ink, such as cyan, magenta, yellow and black ink, a head unit 63 having an ink jet printer head 6 (hereinafter referred to as a head 6) for ejecting ink onto a sheet 62, a carriage 64 on which the ink cartridges 61 and the head unit 63 are mounted, a drive unit 65 that reciprocates the carriage 64 in a straight line, a platen roller 66 that extends in a reciprocating direction of the carriage 64 and is disposed opposite to the head 6, and a purge unit 67. As the black, cyan, magenta and yellow ink, the ink prepared in the above examples can be used.

The drive unit 65 includes a carriage shaft 71, a guide plate 72, two pulleys 73 and 74, and an endless belt 75. The carriage shaft 71 is disposed at a lower end portion of the carriage 64 and extends in parallel with the platen roller 66. The guide plate 72 is disposed at an upper end portion of the carriage 64 and extends in parallel with the carriage shaft 71. The pulleys 73 and 74 are disposed at both end portions of the carriage shaft 71 and between the carriage shaft 71 and the guide plate 72. The endless belt 75 is stretched between the pulleys 73 and 74.

As the pulley 73 is rotated in normal and reverse directions by a motor, the carriage 64, connected to the endless belt 75, is reciprocated in the straight direction, along the carriage shaft 71 and the guide plate 72, in accordance with the normal and reverse rotation of the pulley 73.

The sheet 62 is supplied from a sheet cassette (not shown) provided in the ink jet printer 100 and fed between the head 6 and the platen roller 66 to perform predetermined printing by ink droplets ejected from the head 6. Then, the sheet 62 is discharged to the outside. A sheet feeding mechanism and a sheet discharging mechanism are omitted from FIG. 1.

The purge unit 67 is provided on a side of the platen roller 66. The purge unit 67 is disposed to be opposed to the head 6 when the head unit 63 is located in a reset position. The purge unit 67 includes a purge cap 81, a pump 82, a cam 83, and a waste ink reservoir 84. The purge cap 81 contacts a nozzle surface to cover a plurality of nozzles (described later) formed in the head 6. When the head unit 63 is placed in the reset position, the nozzles in the head 6 are covered with the purge cap 81 to inhale ink including air bubbles trapped in the head 6 by the pump 82 and by the cam 83, thereby purging the head 6. The inhaled ink is stored in the waste ink reservoir 84.

To prevent ink from drying, a cap 85 is provided to cover the nozzles 15 (FIG. 2) in the head 6 mounted on the carriage 64 when it returns to the reset position after printing.

Figure 2:
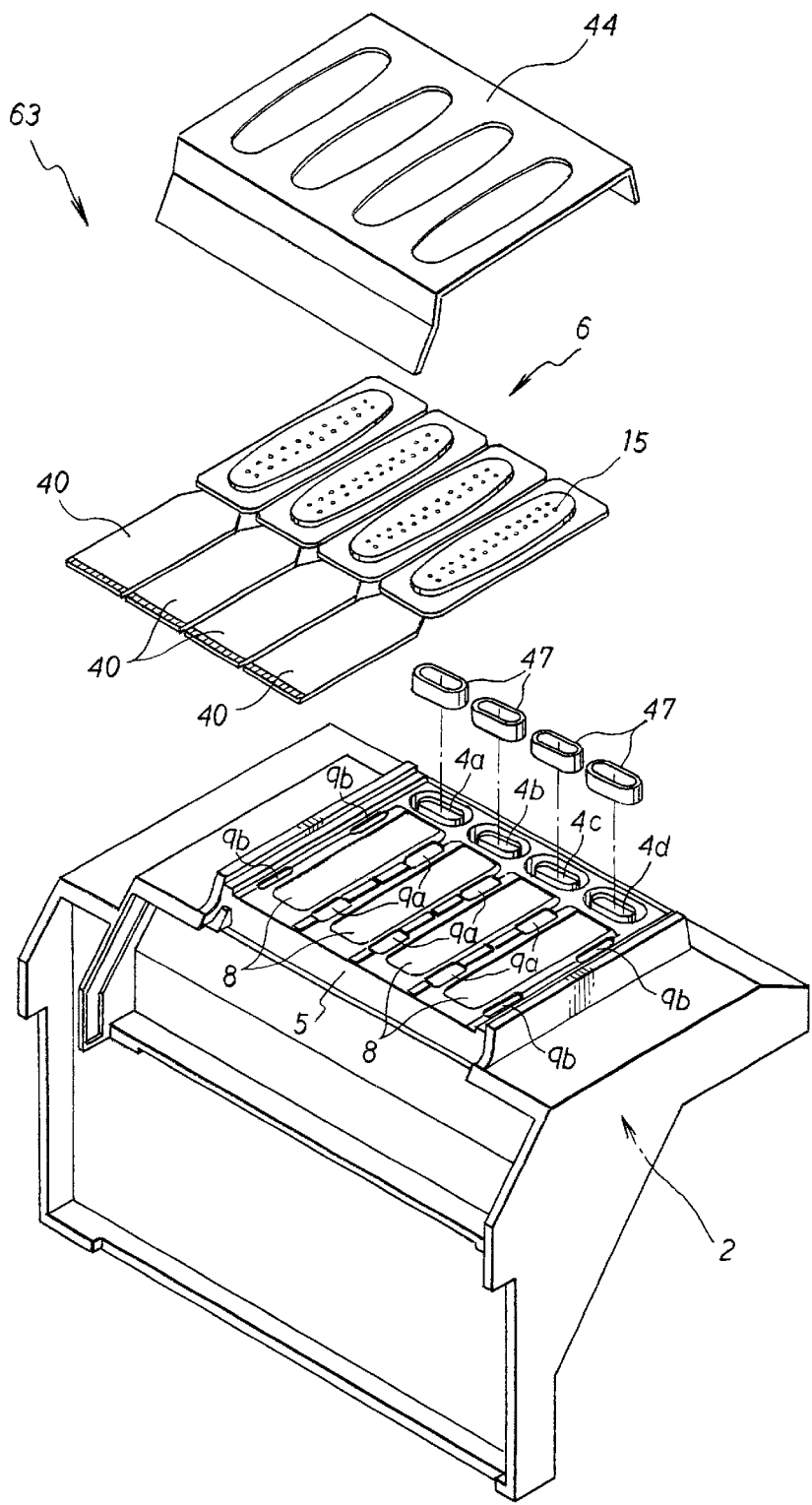
FIG. 2 is a perspective view of a head unit, with its nozzles facing upward.

As shown in FIG. 2, the head unit 63 is mounted on the carriage 64 that moves along the sheet 62 and has a substantially box shape with upper open structure. The head unit 63 has a cover plate 44 made of an elastic thin metallic plate. The cover plate 44 is fixed at the front surface of the head unit 63 and covers the head unit 63 when the head 6 is removed. The head unit 63 also has a mounting portion 2 on which the four ink cartridges 61 are detachably attached from above. Ink supply paths 4a, 4b, 4c, 4d, each of which connects respective ink discharge portions of each ink cartridge 61, communicate with a bottom of a bottom plate 5 of the head unit 63. Each of the ink supply paths 4a, 4b, 4c, 4d is provided with a rubber packing 47 to intimately contact an ink supply hole 19a.

The head 6 is constructed from four blocks that are arranged in parallel to each other. On the underside of the bottom plate 5, four stepped supports 8 are formed to receive the respective blocks of the head 6. In the bottom plate 5, a plurality of recesses 9a, 9b, which are filled with an UV adhesive to bond the respective blocks of the head 6, are formed to penetrate the bottom plate 5.

Figure 3:
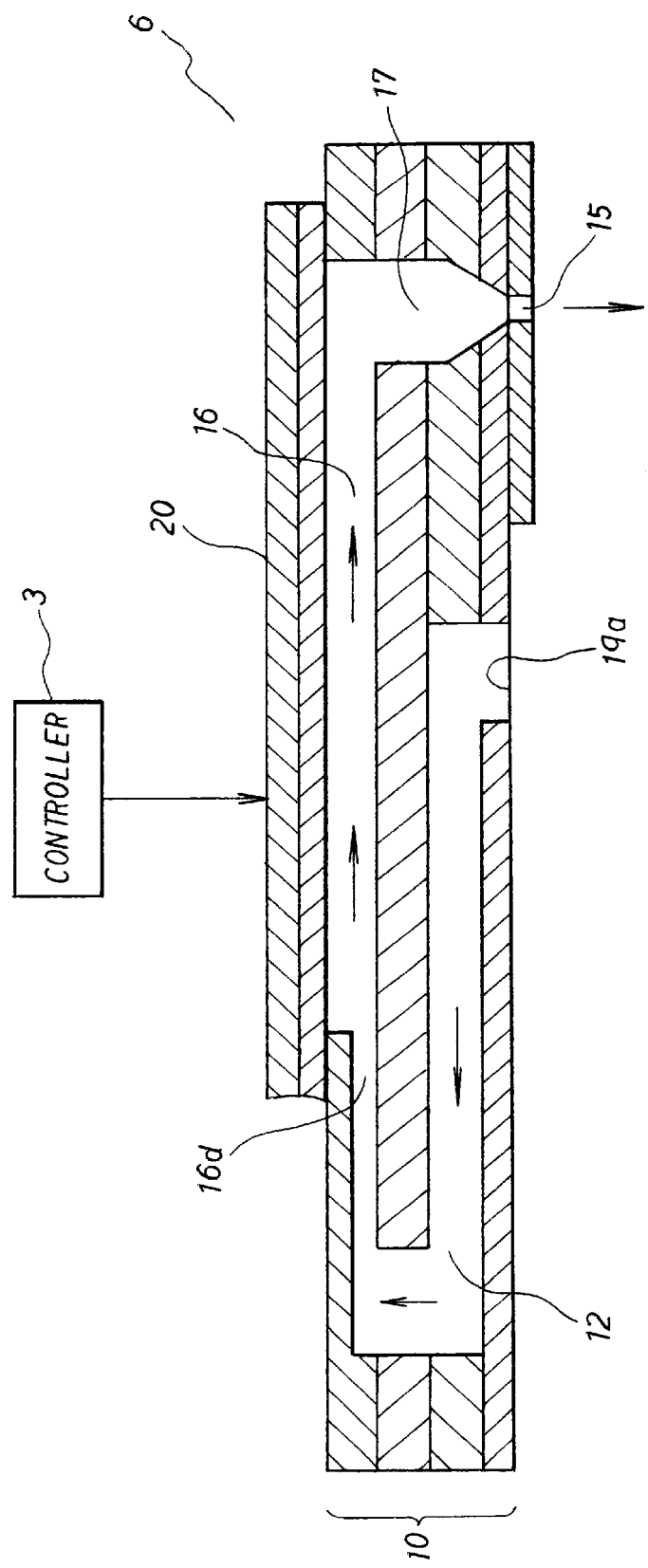
FIG. 3 is a schematic diagram showing the ink jet print head and a controller.

FIG. 3 is a sectional view showing one of the pressure chambers in the head 6. A plurality of pressure chambers 16 are provided in the head 6. The nozzles 15 communicating the respective pressure chambers 16 are provided substantially in line in one surface of the head 6.

As shown in FIG. 3, the head 6 is constructed by the cavity plate 10 and the piezoelectric actuator 20. The cavity plate 10 has the ink supply holes 19a connected with the ink cartridge 61, the manifolds 12, the narrowed portions 16d, the pressure chambers 16, the through holes 17 and the nozzles 15, which communicate with each other. While the ink supply hole 19a opens toward the ejecting direction of the nozzle 15 in FIG. 3 for convenience, the ink supply hole 19a actually opens toward the piezoelectric actuator 20.

A controller 3 provides a prestored driving pulse to the piezoelectric actuator 20 by superimposing the driving pulse on a clock signal. The driving pulse can be controlled with a technique disclosed in, for example, U.S. Pat. Nos. 6,312, 089, 6,412,923 and 6,460,959. Further, the detailed structure of the printer and controlling method of the head unit are also disclosed in these U.S. patents, a content of which has been incorporated herein by reference.

The present invention is constructed as described above. Therefore, it is possible to provide the water base pigment ink for ink-jet recording capable of effecting the vivid color recording in which the feathering and the bleeding are scarcely caused, and the ink-jet recording apparatus which accommodates the ink.

What is claimed is:

1. A method for producing an ink for ink-jet recording, comprising:

preparing a dispersion of a pigment;

preparing an ink solvent containing a water-soluble organic solvent and glycol ether; and mixing the pigment dispersion and the ink solvent, wherein:

amounts of respective components for constituting the pigment dispersion and the ink solvent are adjusted so that an Rf value, which represents a rate of flow of the pigment obtained when the pigment dispersion is developed with the ink solvent by paper chromatography, is not more than 0.5.

2. The method for producing the ink according to claim 1, wherein the pigment is a self-dispersing pigment.

3. The method for producing the ink according to claim 1, wherein the glycol ether is at least one selected from the group consisting of ethylene glycol propyl ether, diethylene glycol propyl ether, triethylene glycol propyl ether, propylene glycol propyl ether, dipropylene glycol propyl ether, and tripropylene glycol propyl ether.

4. The method for producing the ink according to claim 1, wherein the water-soluble organic solvent is glycerol.

5. An ink produced by the method for producing the ink as defined in claim 1.

6. An ink for ink-jet recording comprising:

a dispersion of a pigment;

a water-soluble organic solvent; and at least one glycol ether selected from the group consisting of ethylene glycol propyl ether, diethylene glycol propyl ether, triethylene glycol propyl ether, propylene glycol propyl ether, dipropylene glycol propyl ether, and tripropylene glycol propyl ether, wherein:

an Rf value, which represents a rate of flow of the pigment obtained when the pigment dispersion is developed by paper chromatography with a mixture liquid containing constitutive components of the ink except for the pigment dispersion, is not more than 0.5.

7. The ink for ink-jet recording according to claim 6, wherein the pigment is a self-dispersing pigment.

8. The ink for ink-jet recording according to claim 6, wherein the water-soluble organic solvent is glycerol.

9. An ink-jet recording apparatus comprising:

an ink-jet head;

an ink tank which accommodates an ink to be supplied to the ink-jet head; and the ink as defined in claim 6 which is accommodated in the ink tank.

10. The ink-jet recording apparatus according to claim 9, wherein the pigment is a self-dispersing pigment.

11. The ink-jet recording apparatus according to claim 9, wherein the water-soluble organic solvent is glycerol.

12. The ink-jet recording apparatus according to claim 9, wherein the ink tank is a replaceable ink cartridge.

* * * * *